United States Patent
Lai et al.

(10) Patent No.: US 6,312,706 B1
(45) Date of Patent: Nov. 6, 2001

(54) PREPOLYMERS USEFUL IN BIOMEDICAL DEVICES

(75) Inventors: Yu-Chi Lai; Louis J. Baccei, both of Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/491,983

(22) Filed: Jan. 26, 2000

Related U.S. Application Data

(60) Continuation of application No. 07/705,868, filed on May 28, 1991, which is a division of application No. 07/363,662, filed on Jun. 7, 1989, now Pat. No. 5,034,461.

(51) Int. Cl.$^7$ ............... A61F 13/00; A61F 2/00; A61K 9/00; G02C 7/04
(52) U.S. Cl. ............ 424/422; 424/427; 424/429; 514/912; 351/160 R; 351/160 H
(58) Field of Search ..................... 424/422, 427, 424/429; 514/912; 351/160 H, 160 R

(56) References Cited

U.S. PATENT DOCUMENTS

| | | | |
|---|---|---|---|
| 2,976,576 | 3/1961 | Wichterle | 18/58 |
| 3,220,960 | 11/1965 | Wichterle | 260/2.5 |
| 3,428,043 | 2/1969 | Shepherd | 123/268 |
| 3,520,949 | 7/1970 | Shepherd | 260/857 |
| 3,563,925 | 2/1971 | Kliment | 260/8 |
| 3,566,874 | 3/1971 | Shepherd | 128/349 |
| 3,607,848 | 9/1971 | Stoy | 260/86.1 |
| 3,618,231 | 11/1971 | Nason | 35/35 |
| 3,679,504 | 7/1972 | Wichterle | 156/62 |
| 3,786,034 | 1/1974 | Blair | 260/77.5 |
| 3,821,186 | 6/1974 | Grant | 260/94.9 |
| 4,136,250 | 1/1979 | Mueller | 528/29 |
| 4,309,526 | 1/1982 | Baccei | 528/75 |
| 4,359,553 | 11/1982 | Edwards | 525/240 |
| 4,359,558 | 11/1982 | Gould et al. | 525/454 |
| 4,440,918 | 4/1984 | Rice et al. | 526/246 |
| 4,454,309 | 6/1984 | Gould | 525/454 |
| 4,532,316 | 7/1985 | Henn | 528/65 |
| 4,543,398 | * 9/1985 | Bany et al. | 525/474 |
| 4,605,712 | * 8/1986 | Mueller et al. | 525/474 |
| 4,665,123 | 5/1987 | Goldenberg | 525/92 |
| 4,675,361 | 6/1987 | Ward, Jr. | 525/92 |
| 4,711,943 | 12/1987 | Harvey, III | 526/279 |
| 4,720,187 | 1/1988 | Goldenberg | 351/160 |
| 4,740,533 | * 4/1988 | Su et al. | 523/106 |
| 4,780,488 | 10/1988 | Su | 523/106 |
| 4,837,289 | 6/1989 | Mueller et al. | 526/279 |
| 4,952,614 | 8/1990 | Reiners et al. | 526/301 |
| 5,034,461 | * 7/1991 | Lai et al. | 525/100 |
| 5,070,166 | 12/1991 | Su et al. | 526/301 |
| 5,109,077 | 4/1992 | Wick | 528/65 |
| 5,416,132 | 5/1995 | Yokoyamaetel | 523/107 |
| 5,451,617 | * 9/1995 | Lai et al. | 523/107 |
| 5,760,100 | 6/1998 | Nicolson et al. | 523/106 |

FOREIGN PATENT DOCUMENTS

| | | | |
|---|---|---|---|
| 0 109 355 | 5/1984 | (EP) | C08F/299/08 |
| 0 127 321 | 12/1984 | (EP) | C08F/30/08 |
| 0 301 733 | 2/1989 | (EP) | C08G/18/67 |
| 2 557 576 | 7/1985 | (FR) | C08F/283/00 |
| 2 086 927 | 5/1982 | (GB) | C08F/299/06 |

OTHER PUBLICATIONS

Relogo, M et al., *Contact and Intraocular Lens Medical Journal*, vol. 3, p. 27 (1977).
Fatt, et al., *International Contact Lens Clinic*, vol. 14, p. 389 (1987).
European Search Report for EP Application No. 90305340.3 dated Dec. 6, 1991.

* cited by examiner

*Primary Examiner*—Thurman K. Page
*Assistant Examiner*—Todd D Ware
(74) *Attorney, Agent, or Firm*—John E. Thomas

(57) ABSTRACT

A novel polyurethane based prepolymer useful in biomedical devices which provides high oxygen permeability and superior physical properties.

12 Claims, No Drawings

PREPOLYMERS USEFUL IN BIOMEDICAL DEVICES

This application is a continuation of Ser. No. 07/705,868 filed May 28, 1991 which is a divisional of Ser. No. 07/363,662, filed Jun. 7, 1989 now U.S. Pat. No. 5,034,461.

FIELD OF THE INVENTION

The invention relates to specific prepolymers especially useful as monomers that can be formed into biomedical devices.

BACKGROUND OF THE INVENTION

Heretofore, biomedical materials especially useful commercially as contact lenses have been based upon polymers and/or copolymers of a select set of chemistries. Methylmethacrylic acid type chemistries form the oldest type, the polymers from which poly(methylmethacrylates) (PMMA) have been surpassed by hydrogel chemistries based upon poly(hydroxyethyl methacrylate) (pHEMA) or polyvinyl pyrrolidinone (pNVP), and copolymers of HEMA and NVP. These materials formed the basis for most soft contact lenses.

Silicone chemistries have played a lesser role in the marketplace, but have offered higher oxygen permeabilities than their hydrogel counterparts. They have, however, presented certain performance characteristics which limit their application—specifically surface wettability problems.

Copolymers employing PMMA types of chemistry have been employed in conjunction with silicone chemistry and hydrogel chemistry to produce a wide assortment of materials which have the common characteristics of high oxygen permeability and high modulus (rigidity). These materials have been characterized as hard gas permeable or rigid gas permeable materials.

Urethane chemistries have not been employed commercially in the contact lens market despite significant work in the area such as U.S. Pat. No. 3,786,034 issued to Blair et al relates to hard, hydrophilic polyurethane material formed from reacting a specific polyol with a polyfunctional isocyanate. U.S. Pat. No. 3,821,186 teaches similar materials as U.S. Pat. No. 3,786,034.

U.S. Pat. No. 4,136,250 teaches a polymer formed by reacting a high molecular weight polydimethyl siloxane diol with 2 mole equivalents isophorone diisocyanate and then reacting with excess hydroxy containing monomers. Essentially, this is a soft segment prepolymer endcapped with ethylenically reactive endcap. These materials are relatively weak and in their hydrated form show low degrees of elongation.

U.S. Pat. No. 4,309,526 teaches adhesive compositions which employ low molecular weight polyols reacted with diisocyanates and short chain cycloaliphatic or aromatic diols, endcapped with hydrophilic endcaps. Various characteristics such as oxygen permeability are not mentioned.

U.S. Pat. No. 4,359,553 teaches polyurethane diacrylate compositions useful as biomedical materials which are formed by reacting a diol mw 200 to 20,000 with 2 mole equivalents diisocyanate which is then reached with diethyleneglycol diacrylate to form the water soluble polyurethane. Specific applications taught in the patent are as controlled release matrices.

U.S. Pat. No. 4,454,309 teaches a hydrophilic random block copolymer with polyurethane linkage between randomly using high molecular weight polyols and low molecular weight ethylene mers. The materials absorbed 100–500% by weight additional water.

U.S. Pat. No. 4,740,533 teaches materials which are block copolymers of polyoxyalkylenes and polysiloxanes which have no hard segments.

U.S. Pat. No. 4,780,488 teaches a prepolymer with only a central soft segment endcapped with hydroxyethyl methacrylate endcaps or the like.

The art does not disclose polyurethane prepolymers useful as biomedical materials with the hard-soft-hard or the soft-hard-soft configurations disclosed herein which are oxygen permeable and still exhibit exemplary physical strength characteristics. Nor does the art teach that these prepolymers are useful as biomedical materials.

SUMMARY OF THE INVENTION

The present invention relates to prepolymers especially useful in biomedical copolymers of the general formula:

$$E(*D*A*D*G)_a*D*A*D*E'$$

or $$E(*D*G*D*A)_a*D*G*D*E'$$

where

A denotes a divalent polymeric radical chosen from the group of

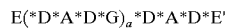
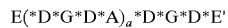
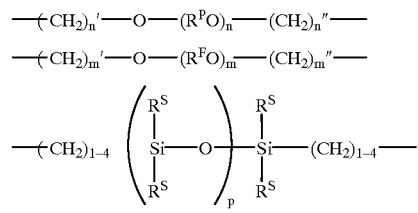

wherein
$R^P$ denotes a straight or branched alkyl group with 1 to 6 carbon atoms and n provides for a moiety weight of the radical between 2000 and 10,000;
$R^F$ denotes a fluorinated straight or branched alkyl radical with 1 to 6 carbon atoms and m provides a moiety weight of between 400 and 10,000;
$R^S$ denotes an alkyl radical or a short chain fluorinated alkyl radical with 1 to 3 carbon atoms; and
p provides a moiety weight of 400 to 10,000;
D denotes an alkyl diradical, an alkyl cycloalkyl diradical, a cycloalkyl diradical, an alkylaryl diradical or an aryl diradical, with 6 to 30 carbon atoms;
G denotes an alkyl diradical, a cycloalkyl diradical, an alkyl cycloalkyl diradical, an aromatic diradical or an alkylaromatic diradical with 1 to 40 carbon atoms which may have ether, thio, or amine linkages in the main chain;
* denotes a urethane or ureido linkage; and
E and E' denote polymerizable unsaturated organic radicals represented by the general chemical formula

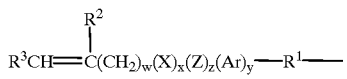

wherein
$R^1$ denotes a divalent alkylene radical with 1 to 10 carbon atoms;
$R^2$ denotes a —H or —$CH_3$ radical;
$R^3$ denotes a —H radical or an alkyl radical with 1 to 6 carbon atoms or a

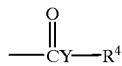

radical where Y is —O—, —S— or —NH— and $R^4$ denotes an alkyl radical with 1 to 12 carbon atoms;

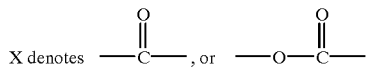

Ar denotes an aromatic radical with 6 to 30 carbon atoms;
a is at least 1;
w is 0 to 6;
x is 0 or 1;
y is 0 or 1; and
z is 0 or 1.

These prepolymers are especially useful in forming copolymerizates with ethylenically unsaturated monomers which are known and used in the biomedical materials field. The resultant copolymers have a combination of oxygen permeability, surface wettability and physical strength in dry and/or hydrated forms otherwise unavailable.

DETAILED DESCRIPTION OF THE INVENTION

The prepolymers of the present invention are especially useful in making biomedical materials due to this combination of physical strength and high oxygen permeability when copolymerized with state of the art ethylenically unsaturated biomedical monomers. The combination of advantageous properties is achieved due to the specific chemistry inherent in the claimed prepolymer.

The prepolymers of the invention can be represented by the general formulae:

E(*D*A*D*G)$_a$*D*A*D*E' or

E(*D*G*D*A)$_a$*D*G*D*E' where
A denotes a divalent polymeric radical chosen from the group of

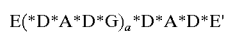
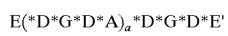

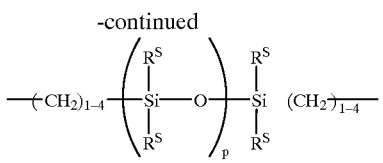

wherein
$R^P$ denotes a straight or branched alkyl group with 1 to 6 carbon atoms and n provides for a moiety weight of the radical between 2000 and 10,000;
$R^F$ denotes a fluorinated straight or branched alkyl radical with 1 to 6 carbon atoms and m provides a moiety weight of between 400 and 10,000;
$R^S$ denotes an alkyl radical or a short chain fluorinated alkyl radical with 1 to 3 carbon atoms; and
p provides a moiety weight of 400 to 10,000;
D denotes an alkyl diradical, an alkyl cycloalkyl diradical, a cycloalkyl diradical, an alkylaryl diradical or an aryl diradical, with 6 to 30 carbon atoms;
G denotes an alkyl diradical, a cycloalkyl diradical, an alkyl cycloalkyl diradical, an aromatic diradical or an alkylaromatic diradical with 1 to 40 carbon atoms which may have ether, thio, or amine linkages in the main chain;
* denotes a urethane or ureido linkage; and
E and E' denote polymerizable unsaturated organic radicals represented by the general chemical formula

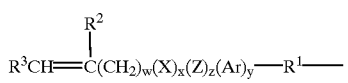

wherein
$R^1$ denotes a divalent alkylene radical with 1 to 10 carbon atoms;
$R^2$ denotes a —H or —$CH_3$ radical;
$R^3$ denotes a —H radical or an alkyl radical with 1 to 6 carbon atoms or a

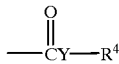

radical where Y is —O—, —S— or —NH— and $R^4$ denotes an alkyl radical with 1 to 12 carbon atoms;

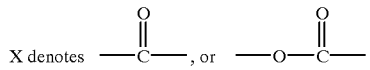

Ar denotes an aromatic radical with 6 to 30 carbon atoms;
a is at least 1;
w is 0 to 6;
x is 0 or 1;
y is 0 or 1; and
z is 0 or 1.

The prepolymers upon polymerization form two domains which can be characterized as hard and soft domains, respectively. The soft domain generally have glass transition temperatures (Tg s) lower than room temperature whereas the hard domains have Tg s higher than room temperature. Upon polymerization, the hard segments of the prepolymer associate with one another and the soft segments form the soft domain which account for the oxygen permeability of the polymeric mass. The combination of hard and soft segments provides the polymer with superior mechanical properties otherwise unavailable.

The hard segments of the prepolymer are formed by the reaction of the short chain diol with the diisocyanate. Thus, in the formulae supra, the "hard segments" are represented by the *D*G*D* portions of the formulae. Thus termed, formula (i) represents a hard-soft-hard prepolymer and formula (ii) represents a soft-hard-soft prepolymer.

The isocyanates which can be used in preparation of the invention include, toluene diisocyanate, 4,4'-diphenyl diisocyanate, 4,4'-diphenylene methane diisocyanate, p-phenylene diisocyanate, dianisidine diisocyanate, 1,5napthalene diisocyanate, 4,4'-diphenyl ether diisocyanate, 4,4'(dicyclohexyl)methane diisocyanate, 1,3-bis-(isocyanato methyl)cyclohexane, cyclohexane diisocyanato, tetrachlorophenylene diisocyanate, isophorone diisocyanate, and 3,5-diethyl-4,4'-diisocyanato diphenyl methane.

Other diisocyanates which may be used are higher molecular weight diisocyanate formed by reacting polyamines which are terminally capped with primary or secondary amines, or polyhydric alcohols with excess of any of the above described diisocyanates. In general, these high molecular weight diisocyanates will have the general formula

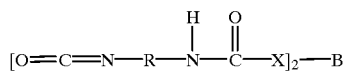

wherein R is a divalent organic radical with 2 to about 20 carbon atoms, X is —O—, or —NR'—, where R is —H or a lower alkyl, and B is a divalent organic radical.

The diisocyanate is reacted with low molecular weight diols or glycols such as 2,2-(4,4'dihydroxydiphenyl)-propane (bisphenol-A), 4,4'-iso-propylidine dicyclohexanol (hydrogenated bisphenol-A), ethoxylated bisphenol-A, propoxylated bisphenol-A, 2,2-(4,4'-dihydroxydiphenyl)-pentane, -α,α'-(4,4'-dihydroxydiphenyl)-p-diisopropyl benzene, 1,3 cyclohexane diol, 1,4-cyclohexane diol-1,4-cyclohexane dimethanol, bicyclic and tricyclic diols such as 4,8-bis-(hydroxymethyl)-tricyclo [5.2.1.0$^{2,6}$] decane, neopentyl glycol, 1,4 butanediol, 1,3-propanediol, 1,5-pentanediol, diethylene glycol, triethylene glycol and the like.

These hard segments as mentioned before form hard domains in the final polymer or copolymer by association via hydrogen bonding with other rigid segments. The degree of association within the hard domain can be modified by controlling the amount of hydrogen bonding between the segments by either 1) decreasing the overall weight content of the hard segment in the prepolymer by increasing the molecular weight of the soft segment or 2) by decreasing the amount of hydrogen bonding density in the hard segment by either using relatively soft, longer chained diols, or by using primary amines or secondary amines capped low molecular weight compounds in conjunction with the diisocyanates rather than the diols.

The hard segments are then reacted with a relatively high molecular weight polymer which is α,ω- endcapped with two active hydrogens, usually hydroxyl groups. These segments form the so-called soft segment of the prepolymer. Various types of high molecular weight polymers can be used including in general polymers of the following formulae a) $HO(CH_2)(R^PO)_n(CH_2)OH;$ b) $HO(CH_2)(R^PO)_m(CH_2)OH;$ and c) 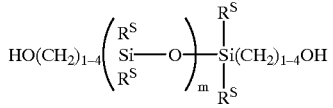

Formulae a) represents polyoxyalkyleneglycols which are generally commercially available in the molecular weight range called for in the present invention. These diols include polymers prepared from the epoxides: ethylene oxide 1,2-propylene oxide, 1,2-butylene oxide, 2,2 epoxydecane, 1,2-epoxyoctane, 2,3-epoxy norborane, 1,2-epoxy-3-ethoxy propane, 2,2-epoxy-3-phenoxypropane, 2,3-epoxypropyl-4-methoxy phenyl ether, tetrahydrofluran, 1,2-epoxy-3-cyclohexyloxy propane, oxetane, 1,2-epoxy-5-hexene, 1,2-epoxyethylbenzene, 1,2-epoxy-1-methoxy-2-methylpropane, benzyloxy propylene oxide, the like and combinations thereof.

The preferred polymers of this class are polypropylene glycols of molecular weights, 2000, 3000 and 4000 and more and polyoxyethylene polyoxypropylene block copolymers with molecular weight greater than 2000.

Formulae b) represents polyfluoroethers with α,ω-active hydrogens. This class of polymers can be synthesized per the heading of U.S. Pat. No. 3,810,874. Generally, these polymers should have molecular weights between 400 and 10,000 to be useful in the present invention.

Formulae c) represents a α,ω-dihydroxyl alkyl endblocked polysiloxane which for the purpose of the present invention should have a molecular weight in the range of 400 to 10,000. These polysiloxanes can be synthesized by reacting a disiloxane of the general formula

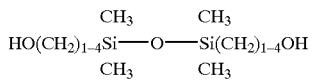

with cyclopolydimethyl siloxane under acidic conditions.

Alternately, the disiloxane can be replaced with dimethoxydimethylsilane or diethoxy dimethyl silane to produce the α,-ωdihydroxy endcapped polysiloxanes.

The endcapping monomers used in the prepolymer are generally represented by the formula

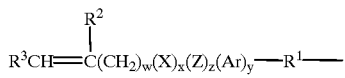

as defined supra. The Stage B reaction product is reacted with an excess of suitable acrylate or methacrylate esters containing a hydroxy or amine group on the non-acrylate or non-methacrylate portion of the monomer to form the endcaps of the above formula. Suitable endcap monomers include hydroxyethyl acrylate, hydroxyethyl methacrylate, aminoethyl methacrylate, 3 hydroxypropyl methacrylate, amino propyl methacrylate, hydroxyhexylacrylate, t-butylaminoethyl methacrylate, monoacrylate or monomethacrylate esters of bisphenol-A and/or bisphenol-B.

General Synthetic Approaches

The prepolymers of the present invention are formed by two general synthetic approaches. One approach produces the hard-soft-hard prepolymer while the second approach produces the soft-hard-soft prepolymer. Variations of each scheme were found to be necessary for specific rigid/soft segment combinations, details of which are disclosed in the examples.

Hard-Soft-Hard Prepolymer Synthetic Schemes

The scheme used to produce this type of prepolymer employed three stages to produce the final prepolymer. The first stage (STAGE A) involved reacting 2 mole equivalents of diisocyanate with about 1 mole equivalent low molecular weight diols described herein. If these diols could be represented by the symbol ▲G▲, where ▲ denotes a hydroxyl radical and G represents the rest of the diol compound, and the diisocyanate functional compound could be represented by •D• where • represents an isocyanate radical, the STAGE A reaction can be schematically represented as follows:

where * denotes a urethane or a ureido linkage. STAGE A produces a so-called "Hard" segment. As is known to those skilled in polymer chemistry, the product •D*G*D• is the mathematical average of all reaction product molecules. The reaction product of the actual reaction will contain •O• and •D(*G*D)$_c$*G*D with $c \geq 2$. Again, the formulas are numerical averages.

STAGE B involves reacting about one half mole equivalent of a α,ω-diol endcapped long chain polymer with the reaction product of STAGE A. If ▲A▲ represents the long chain diol the STAGE B Reaction is

In STAGE C, the reaction product from STAGE B is reached with a molar excess of an endcapping monomer which has: 1) hydroxyl or amine functionality; and 2) some polymerizable unsaturation. If the endcapper is represented by the symbol E▲, where is —OH or —NH$_2$ or —NH—, the reaction proceeds generally as

Optionally, STAGE B can be run with molar excess of A to produce multiblock polymers of the general formula •(D*G*D*A)$_a$*D*G*D• where a is at least 1. This reaction product would be endcapped in STAGE C above.

Soft-Hard-Soft Prepolymer Synthetic Scheme

The second general synthetic scheme using the same nomenclature described is represented by the following general formulae:

Stage A

Stage B

Stage C

In general, each of the reaction stages is run until the reactive step is complete. Reaction progress in STAGES A and B reactants were monitored by acid base titration. The isocyanate content was calculated by the difference of acid equivalents between a stock solution dibutylamine and its reaction product with the diisocyanate reaction intermediate. The reaction was also monitored by ATR-IR for the appearance/disappearance of peaks at 1700 cm$^{-1}$, which indicated the presence of

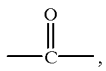

and 2250 cm$^{-1}$ which indicated consumption of —N═C═O.

It was found that the synthesis of the prepolymer could be run neat or in solution. A wide range of aprotic solvents can be used to synthesize the prepolymers of the present invention. Solvents useful in the synthesis include toluene, methylene, chloride, benzene, cyclohexane, hexane, heptane and the like. Preferred solvents are toluene, methylene chloride and mixtures thereof.

Reaction of the prepolymer precursors may be accomplished in the presence or absence of catalysts for urethane reactions, such catalysts being well known in the art. The first step of prepolymer synthesis where diisocyanate is first reacted with a short carbon chain (2 to 30 carbon atoms) diol, particularly where an aromatic diisocyanate is used, proceeds very rapidly, even in the absence of any catalyst. In fact, during the step of reacting diisocyanate and short chain diol, temperature control may be required in order to avoid/minimize side reactions.

Preferably, the first step of prepolymer synthesis in accordance with the present invention is carried out below about 100° C., most suitably within the range of from about 60° C. to about 90° C. Thereafter, the second step of the reaction is carried out at comparable temperatures, preferably within the range of from about 40° C. to 70° C. The final step of prepolymer formation suitably is effected at temperatures of from about room temperature to about 100° C., with a narrow range of from about 40° C. to about 50° C. being most preferred. As will be apparent to those skilled in the art, optimal reaction conditions, such as temperatures and duration, are selected for each individual reaction system to achieve conditions that produce a favorable rate of reaction without fostering undesirable side reactions.

Among the suitable catalysts for use in prepolymer formation are tin salts and organic tin esters, such as dibutyl tin dilaurate, tertiary amines, such as triethyl diamine and other recognized catalysts, such as 1,4-diaza (2.2.2)-bicyclooctane (DABCO).

The prepolymers of the present invention are particularly useful as comonomers with state of the art ethylenically reactive monomers useful in the field of biomedical materials. In general, these monomers are the hydroxyalkyl acrylates and diacrylates such as hydroxyethyl acrylate, hydroxypropyl acrylate, and the corresponding methacrylate compounds, including cyclohexyl methacrylate, methyl methacrylate, isobornyl methacrylate, lauryl methacrylate, triethylene glycol dimethacrylate, isobuty methacrylate and tetrahydrofurfuryl methacrylate and other unsaturated reactive monomers such as acrylamides, methacrylamides, pyrrolidinones, stryene and acrylonitrile can be used as well and other monomers known in the art including fluorinated analogs of all of the previously mentioned monomers and the organo silicone comonomers known in the art. Specific fluorocomonomers include:

(2,2,2-trifluoroethyl) itaconate
(hexafluoroisopropyl) itaconate
(1H, 1H-perfluorooctyl) itaconate
(1H, 1H, 111H-perfluoroundecyl) itaconate
(perfluoro-t butyl) itaconate
(pentafluorophenyl) itaconate
(2H, 2H-perfluorobenzyl) itaconate
(pentafluorophenylmethyl) itaconate
(decafluorocyclohexyl) itaconate
(1H-perfluorocyclohexyl)methyl itaconate
(1,1,1-trifluoroisopropyl)itaconate
1-methyl-4-(hexafluoroisopropyl)monoitaconate
4-(hexafluoroisopropyl)monoitaconate
1-(1H, 1H-perfluorooctyl)-4-hexafluoroisopropyl) itaconate
and methacrylate analogs thereof.

Specific organosilicon comonomers include:
tris(2-acetoxyethyldimethylsiloxy)silylpropyl acrylate and methacrylate
tris(2-carboxyethyldimethylsiloxy)silylpropyl acrylate and methacrylate
tris(3-hydroxypropyldimethylsiloxy)silylpropyl acrylate and methacrylate
acrylate and methacrylate functional, fluorosubstituted alkyl/aryl siloxanes such as:
  tris(3,3,3 trifluoropropyl dimethylsiloxy)silyl propyl acrylate and methacrylate
  tris[3-heptafluoroisopropoxy propyl)]dimethysiloxy silylpropyl acrylate and methacrylate
  tris(pentafluorophenyl dimethysiloxy)silyl propyl acrylate and methacrylate Other potentially useful organosilicon comonomers include:
p-(pentamethyldisiloxanyl)styrene
bis(trimethylsiloxy)
pyrrolidinonyldimethyl
siloxy-silylpropyl acrylate and methacrylate.
When used as comonomers these materials can be used from 5 to 85 weight percent of the final copolymer weight with the balance comprising the prepolymer portion.

Other di-ethylenically reactive monomers can also be used to effect the mechanical and surface properties. Such crosslinks are generally employed in the 0.1 to 5 wt % range.

The polymers and copolymers are formed by a free radical mechanism using a wide variety of known free radical catalysts such as the diacyl peroxides such as benzoyl peroxide; dialkyl peroxides such as di-tert, -butyl peroxide; ketone peroxides such as methylethyl ketone peroxide; and peresters which readily hydrolyze, e.g. tert-butyl peracetate, tert-butyl perbenzoate, di-tert-butyl diperphthalate, etc. A particularly useful class of peroxy initiators are the organic hydroperoxides such as cumene hydroperoxide, methylethyl ketone hydroperoxide, tert-butyl hydroperoxide, etc. The initiators should be used at a concentration of about 0.01 percent to about 10 percent by weight of the total formulation, preferably about 0.1 percent to about 5 percent by weight. Another useful class of initiators comprises carbonyl-containing ultraviolet-activated free radical generators, such as acetophenone, benzophenone, and the benzoin ethers. Other suitable UV initiators are known in the art. Initiator mixtures may also be used.

Solvents can be used in the final copolymerization and/or polymerization process. Solvent choice will depend upon the solubility parameters of the prepolymer and of the comonomers used, if any, and should be chosen to allow full solubilization of all polymerizate components.

In certain instances, the copolymerization process should be carried out without solvent. For instance, when 2-hydroxyethyl methacrylate (HEMA) is copolymerized with one of the prepolymers formed with polyethylene glycol, use of toluene causes the HEMA to form heterogenous domains which are not stable under aggressive hydrolytic conditions.

Some of the preferred copolymers are polymerized from the following comonomer mixtures:

|  | Wt. % | Component |
|---|---|---|
| Copolymer A | 80 | prepolymer of the hard-soft-hard configuration made from 2-hydroxyethyl methacrylate, isophorone diisocyanate, neopentyl glycate and disilanol endcapped polydimethylsiloxane of molecular weight equal to 3000 (INS3H) |
|  | 20 | 2-hydroxyethylmethacrylate |
| Copolymer B | 30–45 | INS3H |
|  | 40–55 | tris(trimethylsiloxy)silylpropyl methacrylate |
|  | 15–25 | N-N dimethylacrylamide |
| Copolymer C | 30–90 | prepolymer of the hard-soft-hard configuration made from hydroxyethylmethacrylate, isophorone diisocyanate 1,4-butanediol and disilanol endcapped polydimethylsiloxane of average molecular weight of about 3000 (IBS3H) or similar polysiloxane of about 4000 molecular weight (IBS4H) |
|  | 10–40 | dimethylacrylamide |
| Copolymer D | 30–90 | IBS4H or IBS3H |
|  | 20–40 | dimethylacrylamide |
|  | 5–30 | tris(trimethylsiloxy)silyl propyl methacrylate |
| Copolymer E | 30–90 | prepolymer of the hard-soft-hard configuration made from 2-hydroxyethylmethacrylate, isophorone diisocyanate, diethylene glycol, and the disilanol endcapped polydimethylsiloxane of molecular weight 3000 or 4000 (IDS3H and IDS4H, respectively) |
|  | 20–40 | dimethylacrylamide |
|  | 1–30 | tris(trimethylsiloxy)silyl propyl methacrylate |

Various homopolymers and copolymers films were formed and characterized by standard testing procedures such as:
1. Tensile strength (g/mm$^2$) and modulus of elasticity were measured per ASTM test method D1708.
2. Elongation was measured per ASTM 1708.
3. Initial tear strength and propagation tear strength were measured per ASTM 1438.
4. Oxygen permeabilities were measured by the method reported by Relojo, M. et al in *Contact and Intraocular Lens Medical Journal*, Vol. 3, issued p. 27 (1977) and edge effects were accounted for per the methods described by Fatt, et al. in *International Contact Lens Clinic*, V. 14, p. 389 (1987).
5. Water content is measured per a gravimetric method.
6. Refractive index was measured per typical methods on hydrated samples using a refractometer.

As mentioned, the prepolymers of the present invention are particularly useful in forming shaped articles used in biomedical applications. These polymers and copolymers can be used to make biomedical devices i.e. shaped articles, such as dialyzer diaphragms, to prepare artificial kidneys and other biomedical implants, such as disclosed in Wichterle, U.S. Pat. No. 2,976,576 and Wichterle, U.S. Pat. No. 3,220,960. The instant polymers and copolymers can be used in preparing therapeutic bandages as disclosed in Shephard, U.S. Pat. No. 3,428,043. The instant polymers and copolymers can also be used in preparing medical surgical devices e.g. heart valves, vessel substitutes, intra-uterine devices, membranes and other films, dialyzer diaphragms, catheters, mouth guards, denture liners and other such devices as disclosed in Shephard U.S. Pat. No. 3,520,949 and Shephard U.S. Pat. No. 3,618,231. The instant polymers and copolymers can be used to modify collagen to make blood vessels, urinary bladders and other such devices as disclosed in Kliment U.S. Pat. No. 3,563,925. The instant polymers and copolymers can be used to make catheters as disclosed in Shephard U.S. Pat. No. 3,566,874. The instant polymers and copolymers can be used as semipermeable sheets for dialysis, artificial dentures and all of such disclosures as set forth in Stoy U.S. Pat. No. 3,607,848. The instant polymers and copolymers can be used in ophthalmic prostheses and all other uses disclosed in Wichterle U.S. Pat. No. 3,679,504. They may also be used as a polymeric matrix for controlled release of active pharmaceutical agents.

In the following examples, the properties of such films derived from the claimed prepolymer and combinations of prepolymers with various comonomers are described. For certain comonomers which employed "hydrophilic" comonomers, the films were hydrated to "hydrogel" states-their physical properties were measured as hydrated. The following examples are meant to illustrate the invention, but do not define the final scope of the invention.

EXAMPLE 1
Synthesis of Hard-Soft-Hard Prepolymer Based on Toluene-2,4-Diisocyanate 2 mole equivalents of toluene-2,4-diisocyanate (TDI) were dissolved in toluene with one mole equivalent hydrogenated bisphenol A (HBPA) in a resin kettle with constant stirring under nitrogen. This STAGE A reaction was run at 60–90° C. for 2–3 hours in the presence of 0.5 wt % "DABCO" catalyst.

One mole equivalent of polypropylene glycol with a molecular weight of about 1000 was then slowly added to the reaction mixture and reacted for 2–3 hours at 60–80° C. under nitrogen.

Excess 2-hydroxyethyl methacrylate (HEMA) was added to the isocyanate terminated STAGE B reaction mixture and then reacted to completion.

Variations of the above synthesis were run by substituting neopentylglycol (NPG) for the hydrogenated Bisphenol A, and by substituting various molecular weight polypropylene glycols for the PPG-1000.

The resulting prepolymers were homopolymerized between treated glass plates in the presence of a free radical catalyst, benzoin methylether. The polymerization was UV initiated in toluene. The solvent was removed by vacuum and the resultant films were characterized. The results obtained are reported in TABLE 1.

The oxygen permeability of the homopolymers increase as the molecular weight of the polypropylene glycol increased.

EXAMPLE 2
Hard-Soft-Hard Prepolymer Using Isophorone Diisocyanate (IPDI)

The same basic synthetic procedure as described in the previous example was employed except that, due to the decreased reactivity of isophorone diisocyanate relative to toluene diisocyanate, higher levels of reaction catalyst were used. Reaction conditions and summary of the cured homopolymer films is reported in TABLE 2.

Once again, the oxygen permeability of the cured prepolymer increased with increasing molecular weight of the polypropylene glycol polymer. These prepolymers did not produce yellowed films as the TDI materials did upon hydrolytic testing.

TABLE 1

| Composition | $R_x$Temp | Solvent | Catalyst (Dabco) | $O_2$ Permeability (DK) |
|---|---|---|---|---|
| TD1-NPG-PPG-1000-HEMA | 45 | methylene chloride | A = 0<br>B,C = 0.05 wt % | 2 |
| TD1-NPG-PPG-2000-HEMA | 45 | methylene chloride/ 2 toluene | A = 0<br>B,C = 0.05 | 9 |
| TD1-NPG-PPG-3000-HEMA | 45 | toluene | A = 0<br>B,C = 0.05 | 20 |
| TD1-NPG-PPG-4000-HEMA | 45 | 2 toluene/ 1 methylene chloride | A = 0<br>B,C = 6.05 | 30 |
| TD1-HBPA-PPG-1000-HEMA | $A_1B = 75$<br>C = 60 | toluene/ methylene chloride | A = 0<br>B,C = 0.05 | 2 |
| TD1-HBPA-PPG-2000-HEMA | $A_1B = 75$<br>C = 60 | toluene/ methylene chloride | A = 0<br>B,C = 0.05 | 5 |
| TD1-HBPA-PPG-3000-HEMA | $A_1B = 75$<br>C = 60 | toluene/ methylene chloride | A = 0<br>B,C = 0.05 | 15 |
| TD1-HBPA-PPG-3000-HEMA | $A_1B = 75$<br>C = 60 | toluene/ methylene chloride | A = 0<br>B,C = 0.05 | 25 |

TABLE 2

IPDI BASED HARD-SOFT-HARD FILMS

| Composition | Solvent | Rx Temp A | Rx Temp B | Rx Temp C | Catalyst* (concen. %) A | Catalyst* (concen. %) B | Catalyst* (concen. %) C | Oxygen Permeability (DK) | Contact Angle (°) |
|---|---|---|---|---|---|---|---|---|---|
| IPDI-NPG-PPG-1000-HEMA | Toluene | 80 | 80 | 50 | 0.25 | 0.25 | 0.25 | 3.4 | 53 |
| IPDI-NPG-PPG-2000-HEMA | Toluene | 80 | 80 | 60 | 0.5 | 0.5 | 0.5 | 13.8 | 35 |
| IPDI-NPG-PPG-3000-HEMA | Toluene | 80 | 80 | 60 | 0.5 | 0.5 | 0.5 | 24.3 | 42 |
| IPDI-NPG-PPG-4000-HEMA | Toluene | 75 | 85 | 50 | 0.25 | 0.25 | 0.25 | 33.2 | 41 |
| IPDI-CHDM-PPG-1000-HEMA | Toluene | 85 | 85 | 50 | 0.25 | 0.25 | 0.25 | 2.0 | 59 |
| IPDI-CHDM-PPG-2000-HEMA | Toluene | 85 | 85 | 45 | 0.5 | 0.25 | 0.25 | 10.9 | 43 |
| IPDI-CHDM-PPG-3000-HEMA | Toluene | 80 | 80 | 60 | 0.5 | 0.25 | 0.25 | 21.0 | 42 |
| IPDI-CHDM-PPG-4000-HEMA | Toluene | 85 | 85 | 50 | 0.25 | 0.25 | 0.25 | 30.1 | 41 |
| IPDI-HBPA-PPG-1000-HEMA | Toluene | 85 | 85 | 50 | 0.25 | 0.25 | 0.25 | 1.5 | 62 |
| IPDI-HBPA-PPG-2000-HEMA | Toluene | 85 | 85 | 45 | 0.25 | 0.5 | 0.5 | 8.0 | 41 |
| IPDI-HBPA-PPG-3000-HEMA | Toluene | 85 | 85 | 45 | 0.3 | 0.3 | 0.3 | 17.4 | 44 |
| IPDI-HBPA-PPG-4000-HEMA | Toluene | 80 | 80 | 50 | 0.25 | 0.25 | 0.25 | 24.1 | 44 |

EXAMPLE 3

4,4-Di-Cyclohexyl Methane Diisocyanate Based Hard-Soft-Hard Prepolymers

Hard-soft-hard prepolymers were synthesized per the examples supra except that $H_{12}$-MDI was used. Films were cured from 30°% prepolymer solution in toluene as reported in TABLE 3.

TABLE 3

$H_{12}$-MDI HARD-SOFT-HARD PREPOLYMERS

| Composition | | Oxy (DK) | Contact Angle(°) | Tear (P) (g/mm) | Tensile Strength (g/mm$^2$) | Modulus (g/mm$^2$) | Elongation (%) |
|---|---|---|---|---|---|---|---|
| NPG | PPG-1000 | 2.3 | 41 | * | 132.9 | 828 | 170.1 |
| | PPG-2000 | 10.7 | 39 | 187 | 743.2 | 931.2 | 172.5 |
| | PPG-3000 | 20.4 | 33 | 91.8 | 514.5 | 386.5 | 190.8 |
| | PPG-4000 | 29.3 | 39 | 108 | 201.5 | 185.1 | 218.2 |
| CHDM | PPG-1000 | 1.8 | 44 | * | 1282 | 16000 | 173.8 |
| | PPG-2000 | 8.4 | 41 | 437 | 612.7 | 1676 | 282.1 |
| | PPG-3000 | 18.6 | 38 | 290 | 399.9 | 373.2 | 348.7 |
| | PPG-4000 | 28.0 | 41 | 170 | 169.9 | 170 | 301.9 |
| HBPA | PPG-1000 | 1.2 | 62 | * | 2271 | 32610 | 84.6 |
| | PPG-2000 | 6.4 | 43 | 256 | 1160 | 3590 | 221.7 |
| | PPG-3000 | 14.2 | 41 | 197 | 672.2 | 1607 | 217.5 |
| | PPG-4000 | 23.2 | 44 | 130 | 433.9 | 615.9 | 198.6 |

* too stiff to measure

In general, the $H_{12}$-MDI prepolymers produced films with greater tear strengths than the TDI or IPDI diisocyanate based systems and were slightly less oxygen permeable.

EXAMPLE 4

Copolymers of IPDI Based Hard-Soft-Hard Prepolymers with Hydrophilic Monomers A hard-soft-hard prepolymer produced with isophorone diisocyanate (IPDI), neopentyl glycol (NPG), polypropylene glycol with a molecular weight of 4000 and 2-hydroxethyl methacrylate was copolymerized with a hydrophilic comonomer. Various copolymers of this prepolymer (INP4H) with various comonomers were made and tested.

The general scheme for making the copolymer involved mixing the prepolymer with the comonomer in a 30–70 wt % solution in toluene in the presence of a known free radical catalyst. The solutions were placed between treated glass plates and polymerized. The films were then physically characterized.

Specific hydrophilic comonomers used were 2-hydroxethyl methacrylate and N-2-vinylpyrrolidinone. The characteristics of these copolymers is disclosed in TABLE 4.

Several interesting features are displayed by the resultant films. In general, the contact angle of the material was lowered as the content of hydrophilic comonomers increased, as did water content. However, oxygen permeability decreased as the water content of the hydrated material increased. Normally, water content and $O_2$ permeability of hydrogel materials is directly related rather than inversely related.

EXAMPLE 5

Polymer Alloys of Polymerized Hard-Soft-Hard Materials

A homopolymer of INP4H was prepared and then soaked in a solution of N-vinyl pyrrolidinone containing a free radical catalyst. The films were then subjected to UV radiation in order to polymerize the N-vinylpyrrolidone. Based upon analysis of the extracted parties of the polymerized polymer alloy, wt % of polymerized N-vinyl pyrrolidinone could be calculated. The characteristics of these polymer alloys is reported in TABLE 5.

It was observed that these alloy materials felt much more slippery than the copolymers made from the same monomer combinations.

TABLE 4

IPDI BASED HARD-SOFT-HARD/HYDROPHILIC COMONOMERS

| Copolymer Composition | Water Content (%) | $O_2$ (DK) | Contact Angle (°) | Tear (p) Strength (g/mm) | Tensile Strength $g/mm^2$ | Tensile Modulus $g/mm^2$ | Elong. % |
|---|---|---|---|---|---|---|---|
| INP4H:HEMA | | | | | | | |
| 100:0 | — | 33.2 | 41 | 74.2 | 219.3 | 117.8 | 294 |
| 80:20 | 8.3 | 19.7 | 36 | 55.2 | 65.4 | 162 | 285 |
| 60:40 | 19.4 | 13.3 | 38 | 31.0 | 97.4 | 91.1 | 258 |
| 40:60 | 26.5 | 10.4 | 37 | 13.0 | 58.8 | 80.0 | 155 |
| 0:100 | 38.6 | 9 | — | 4.2 | 56 | 57 | 225 |
| INP4H:NVP | | | | | | | |
| 90:10 | 9.0 | 15.9 | 45 | — | — | — | — |
| 80:20 | 17.7 | 24.4 | 37 | 15.1 | 55.8 | 71.4 | 243 |
| 60:40 | 43.7 | 25.7 | 35 | 5.3 | 77.7 | 117.9 | 174 |
| 40:60 | 58.5 | 31.6 | 37 | 2.5 | 17.4 | 50.8 | 72.4 |

TABLE 5

POLYMER ALLOYS

| Alloy Composition | Water Content (%) | $O_2$ (DK) | Contact Angle (°) |
|---|---|---|---|
| INP4H:NVP (IPN) | | | |
| 96.6:3.4 | 7.9 | 26.2 | 55 |
| 94.8 5.2 | 12.6 | 25.7 | 43 |
| 89.5 10.9 | 15.8 | 25.5 | 46 |
| 81.3 18.7 | 27.7 | 17.9 | 40 |
| 78.2 21.8 | 31.3 | 20.6 | 39 |
| 74.8 25.2 | 38.7 | 22.9 | 38 |

EXAMPLE 6

Copolymers of Hard-Soft-Hard Prepolymer (INP4H) with Fluoromonomers

In the interest of producing copolymers with less lipid uptake values certain fluorinated comonomers, octafluoropentyl methacrylate (OFPMA) and hexafluoro isopropyl methacrylates, (HFIPMA) were copolymerized with INP4H prepolymers in various ratios. The cured copolymer films are characterized in TABLE 6.

As the fluoro content of the copolymer was increased the oleic acid pickup decreased with a concomitant decrease in oxygen permeability. The samples with 80 wt % fluoromonomer content were too brittle to characterize.

EXAMPLE 7

Copolymers of INP4H with Silicone Monomers

Various copolymers were produced from combinations of INP4H with tris(trimethylsiloxy)silylpropyl methacrylate (referred to as tris) and 2-hydroxyethyl methacrylate and characterized in TABLE 7.

These copolymers exhibit very good oxygen permeabilities and oleic acid uptake characteristics as well as vastly superior tear strengths and tensile moduli with respect to pHEMA.

TABLE 6

COPOLYMERS OF INP4H WITH FLUORINATED COMONOMERS

| Composition | $O_2$ (DK) | Contact Angle (°) | Tear Strength $g/mm^2$ | Tensile Strength $g/mm^2$ | Tensile Modulus $g/mm^2$ | Elongation (%) |
|---|---|---|---|---|---|---|
| INP4H:OFPNA | | | | | | |
| 80:20 | 23.9 | 40 | 107 | 238.1 | 254.6 | 225 |
| 60:40 | 20.8 | 45 | 155 | 412.8 | 365.4 | 320 |
| 40:60 | 17.6 | 50 | 447 | 569.7 | 3020 | 318 |
| 20:80 | — | — | — | — | — | — |
| INP4H:HGIPMA | | | | | | |
| 80:20 | 28.0 | 40 | 269 | 405.9 | 615.2 | 263 |
| 60:40 | 24.8 | 42 | 235 | 1043 | 2408 | 383 |
| 40:60 | 21.3 | 44 | — | — | — | — |
| 20:80 | — | — | — | — | — | — |

TABLE 7

INP4H-TRIS-HEMA COPOLYMERS

| Copolymer Composition | Water Content (%) | Appear. | $O_2$ (DK) | Contact Angle (°) | Protein µg/mg | Oleic (dry film) % | Tear (P) (g/mm) | Tensile Modulus (g/mm$^2$) | Elong (%) |
|---|---|---|---|---|---|---|---|---|---|
| INP4H:HEMA:Tris | | | | | | | | | |
| 100:0:0 | 33.2 | Clear | 33.2 | 41 | | 348 | 74.2 | 117.8 | 254 |
| 80:20:0 | 8.3 | Clear | 13.3 | 36 | 0 | 179 | 55.2 | 162 | 285 |
| 60:40:0 | 19.4 | Clear | 19.7 | 38 | 0 | 113 | 31.0 | 91.1 | 258 |
| 40:60:0 | 26.5 | Hazy | 10.4 | 37 | 0 | 43.6 | 13.0 | 80.0 | 155 |
| 0:100:0 | 38.6 | Clear | 9.0 | — | 0–1 | 29.0 | 4.2 | 57.0 | 225 |
| 60:20:20 | 6.4 | Clear | 31.7 | 33 | 0 | 216 | 50.0 | 55.4 | 345 |
| 50:20:30 | 7.8 | Clear | 42.4 | 40 | 0 | 192 | 42.6 | 56.3 | 399 |
| 40:20:40 | 9.8 | Clear | 52.9 | 42 | 0 | 192.0 | 82.2 | 75.4 | 460 |
| 40:50:10 | 17.5 | Hazy | 15.9 | 32 | 0 | 62.5 | | | |
| 40:40:20 | 13.4 | Clear | 22.9 | 30 | 0 | 79.6 | | | |
| 40:30:30 | 10.5 | Clear | 26.7 | 33 | 0 | 112 | | | |
| 40:20:40 | 5.7 | Clear | 43.5 | 34 | 0 | 172 | | | |

EXAMPLE 8

Hydrolytic Stability of INP4H/HEMA Copolymers

Hydrolytic stability testings of INPD4H/HEMA copolymers formed in toluene were conducted by subjecting the copolymeric samples to hostile aqueous conditions (either acidic or basic $H_2O$ at elevated temperatures) for extended periods of up to 14 days. These copolymers showed consistent and significant loss of mass during the hydrolytic testing which indicated that the copolymerization process was not efficient.

Chemical analysis of the extracted portion revealed that the portion being extracted was largely an oligomeric product of the 2-hydroxyethyl methacrylate.

Subsequently, INP4H/HEMA/TRIS copolymers were produced without aid of a solvent. These copolymers proved to be hydrolytically stable under the same conditions as the toluene solution produced polymers had been treated under.

EXAMPLE 9

Synthesis of Hard-Soft-Hard Prepolymers Using Polysiloxane Diols and Copolymers Thereof α,ω-bis(hydroxybutyldimethylsily)polysiloxane was prepared by reacting dimethoxydimethylsilane with 1,3-bis(4-hydroxybutyl)tetramethyldisiloxane in water under acidic conditions. The average molecular weight of the polymer was about 3100. Using the general synthetic scheme for hard-soft-hard prepolymers with the above long chain diol, isophorone diisocyanate (IPDI), neopentylglycol (NPG) and 2-hydroxyethyl methacrylate end blocker (HEMA), a prepolymer was formed (INS3H).

This prepolymer was copolymerized with 2-hydroxyethyl methacrylate in various ratios. The characteristics of these copolymers is reported in TABLE 8.

These films were all hydrolytically stable.

EXAMPLE 10

Terpolymers of INP4H Prepolymers

Terpolymers of INP4H/TRIS/glycerol methacrylate (GM) and INP4H/TRIS/N-N-dimethylacrylamide (DMM) were prepared and evaluated. The characteristics of these films is summarized in TABLES 9A and 9B.

These terpolymers provide soft hydrogel type materials with excellent oxygen permeability and physical strength characteristics.

TABLE 9B

| INP4H:TRIS:DMA | $O_2$ DK |
|---|---|
| 30:50:20 | 80 |
| 25:50:25 | 75 |

TABLE 8

INS3H/HEMA COPOLYMERS

| Composition | $O_2$ (DK) | % $H_2O$ | Modulus | Elongation | Tear |
|---|---|---|---|---|---|
| INS3H:HEMA | | | | | |
| 80:20 | 262 | 5 | 6600 | 140 | 10 |
| 70:30 | 189 | 9 | 4500 | 170 | 12 |
| 60:40 | 112 | 13 | 1800 | 160 | 80 |

TABLE 9A

INP4H:TRIS:GM TERPOLYMERS

| Formulation | $O_2$ (DK) | Contact Angle (°) | % $H_2O$ | Tensile | Modulus | Strength | Tear |
|---|---|---|---|---|---|---|---|
| INP4H:TRIS:GM | | | | | | | |
| 30:50:20 | 78 | 48 | 14 | 62 | 94 | 380 | 83 |
| 25:50:25 | 86 | — | 11 | 82 | 370 | 300 | 90 |
| 20:50:30 | 62 | — | 17 | 96 | 250 | 170 | 45 |

EXAMPLE 11

Hard-Soft-Hard Urethane Silicone Prepolymers with "Softer" Hard Portions

Siloxane containing prepolymers were produced as before except 1,4 butanediol or diethyleneglycol was used in place of neopentyl glycol. In general, the homopolymers and copolymers of these materials had lower modulis and tear strengths than their neopentyl glycol based counterparts.

IBS4H Prepolymer is formed using the general scheme for hard-soft-hard prepolymers using isophorone diisocyanate, 1,4-butanediol, the α,ω-hydroxyalkyl endcapped polydimethylsiloxane described earlier with a molecular weight of about 4000, and 2-hydroxyethyl methacrylate.

IBS3H Prepolymer is the same prepolymer as IBS4H except with a lower molecular weight polydimethylsiloxane. IDS4H and IDS3H are equivalent to IBS4H and IBS3H, respectively, except diethyleneglycol was used in place of 1,4 butanedial.

The physical characteristics of copolymers formed from these prepolymers with dimethylacrylamide (DMA) and/or tris (trimethylsiloxy)silyl propyl methacrylate are reported in TABLE 10. All of the prepolymers were hydrolytically stable.

EXAMPLE 12

Soft-Hard-Soft Prepolymers

According to the general scheme for producing soft-hard-soft prepolymers were formed using 2-hydroxyethyl-methacrylate (HEMA), isophorone diisocyanate (IPDI), neopentyl glycol (NPG) and a disilanol endcapped polydimethylsiloxane with an average molecular weight of about 1500 (Si-1500). The general chemical structure of the prepolymer was HEMA-IPDI-Si-1500-IPDI-NPG-IPDI-Si-1500-HEMA Copolymers of the above prepolymer were formed with N-N-Dimethylacrylamide and tris(trimethylsiloxy)silyl-propylmethacrylate as reported in TABLE 11.

Comparative Example

Soft Segment Prepolymer

To illustrate the beneficial properties of the invention a comparative prepolymer was formed from 2-hydroxyethyl methacrylate (HEMA), isophorone diisocyanate (IPDI) and an α,ω-dihydroxyalkyl endcapped polydimethyl siloxane with an average molecular weight of about 3000 (Si-3000). The structure of the prepolymer was HEMA-IPDI-Si-3000-IPDI-HEMA Copolymers of this prepolymer with N-N-dimethyl acrylamide and tris(trimethylsiloxy)silylpropyl-methacrylate are characterized in TABLE 12.

These copolymers displayed much lower tear, modulus and tensile strength than the copolymers of the present invention.

TABLE 10

HARD-SOFT-HARD SILICONE PREPOLYMERS

| Formulation | $O_2$ (DK) | Water % | Contact Angle (°) | Tensile (g/mm$^2$) | Modulus (g/mm$^2$) | Elongation % | Tear (g/mm$^2$) |
|---|---|---|---|---|---|---|---|
| IBS3H:DMA | | | | | | | |
| 100:0 | 399.3 | 0 | — | 347.4 | 1242 | 70.4 | 28.2 |
| 70:30 | 110.4 | | 55 | 124.0 | 531.0 | 70.5 | 13.2 |
| 60:40 | 49.2 | | 59 | 75.6 | 239.2 | 62.1 | 6.4 |
| IBS4H:DMA | | | | | | | |
| 100:0 | 146.8 | | | 193.7 | 574.9 | 82.7 | 11.1 |
| 70:30 | 126.5 | | | 57.2 | 186.5 | 53.3 | 5.0 |
| 60:40 | 71.7 | 38.2 | | 49.1 | 155.6 | 52.3 | 3.4 |
| IDS3H:DMA:Tris | | | | | | | |
| 100:0:0 | 478.8 | — | | 480.3 | 2861 | 56.1 | 36.9 |
| 70:30:0 | 67.0 | 26.4 | | 65.2 | 220.5 | 45.0 | 3.8 |
| 60:30:10 | 60.1 | 31.1 | | 55.7 | 169.2 | 53.5 | 4.9 |
| 50:30:20 | 45.6 | 40.6 | | 48.9 | 140.5 | 56.9 | 2.4 |

TABLE 10-continued

HARD-SOFT-HARD SILICONE PREPOLYMERS

| Formulation | O₂ (DK) | Water % | Contact Angle (°) | Tensile (g/mm²) | Modulus (g/mm²) | Elongation % | Tear (g/mm²) |
|---|---|---|---|---|---|---|---|
| 40:30:30 | 113.1 | 22.4 | | 59.5 | 79.8 | 133.8 | 15.1 |
| 60:40 | 36.4 | 38.9 | | 58.0 | 223.4 | 37.4 | 2.4 |
| IDS4H:DMA:Tris | | | | | | | |
| 100:0:0 | 74.2 | | | 602.7 | 1141 | 41.4 | — |
| 70:30 | 120.4 | | | 52.1 | 175.6 | 46.5 | 2.4 |
| 60:30:0 | 76.4 | 29.2 | | 42.7 | 116.5 | 59.0 | 2.7 |
| 50:30:20 | 113.4 | 28.2 | | 34.9 | 68.5 | 88.2 | 4.8 |
| 60:40 | 67.0 | | | 43.6 | 173.8 | 34.8 | 2.5 |

TABLE 11

SOFT-HARD-SOFT PREPOLYMERS

| Formulation | (DK) | % Water | Contact Angle (°) | Tensile g/mm² | Modulus g/mm² | Elongation % | Tear g/mm |
|---|---|---|---|---|---|---|---|
| Prepolymer/DMA/Tris | | | | | | | |
| 100/0/0 | 283 | — | — | 60 | 4500 | 164 | 70 |
| 70/30/0 | 114 | 25.7 | 51 | 111 | 350 | 70 | 35 |
| 35/30/35 | 114 | 23.8 | 52 | 84 | 140 | 150 | 35 |
| 40/30/30 | 99 | 24.3 | — | 63 | 100 | 130 | 35 |

TABLE 12

COMPARATIVE SOFT SEGMENT PREPOLYMER

| Formulation | (DK) | % Water | Contact Angle (°) | Tensile g/mm² | Modulus g/mm² | Elongation % | Tear g/mm |
|---|---|---|---|---|---|---|---|
| Prepolymer/DMA | | | | | | | |
| 100:0: | 624 | 0 | — | 195 | 620 | 53 | 9 |
| 70:30: | 158 | 25 | — | 56 | 250 | 30 | 3 |

What is claimed is:

1. A hydrogel material that is the polymerization product of a comonomer mixture comprising:

(a) a polysiloxane-containing urethane prepolymer end-capped with polymerizable ethylenically unsaturated organic radicals, wherein the polymerizable unsaturated organic radicals comprise radicals represented by the general chemical formula:

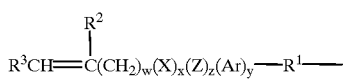

wherein

R¹ denotes a divalent alkylene radical with 1 to 10 carbon atoms;
R² denotes a —H or —CH₃ radical;
R³ denotes a —H radical or an alkyl radical with 1 to 6 carbon atoms or a —COY—R⁴ radical where Y is —O—, —S— or —NH— and R⁴ denotes an alkyl radical with 1 to 12 carbon atoms;
Z is —O— or —NH—;
X denotes —CO— or —OCO—;
Ar denotes an aromatic radical with 6 to 30 carbon atoms;
w is 0 to 6; x is 0 or 1; y is 0 or 1; and z is 0 or 1;

(b) tris(trimethylsiloxy)silylpropyl methacrylate in an amount effective to improve percent elongation of the hydrogel material; and (c) a hydrophilic comonomer selected from the group consisting of N-vinyl-2-pyrrolidinone, N,N-dimethylacrylamide, and mixtures thereof, said hydrogel material having oxygen permeability and mechanical properties suitable for hydrogel contact lens applications, and a water content of at least about 20 weight percent.

2. The hydrogel material of claim 1, wherein the comonomer mixture comprises:

(a) 30 to 90 weight percent of the polysiloxane-containing urethane prepolymer;
(b) 1 to 30 weight percent of tris(trimethylsiloxy) silylpropyl methacrylate; and (c) 20–40 weight percent of the hydrophilic monomer.

3. The hydrogel material of claim 2, wherein the hydrophilic monomer includes dimethylacrylamide.

4. The hydrogel material of claim 1, wherein the polysiloxane-containing urethane prepolymer is described by the general chemical formulae

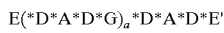

or

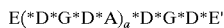

where

A denotes a divalent polysiloxane radical of the formula

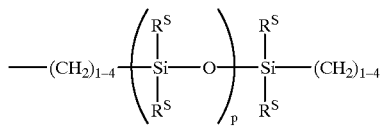

$R^s$ denotes an alkyl radical or a short chain fluorinated alkyl radical with 1 to 3 carbon atoms;

p provides a moiety weight of 400 to 10,000:

D denotes an alkyl diradical, an alkyl cycloalkyl diradical, a cycloalkyl diradical, an alkylaryl diradical or an aryl diradical, with 6 to 30 carbon atoms;

G denotes an alkyl diradical, a cycloalkyl diradical, an alkyl cycloalkyl diradical, an aromatic diradical or an alkylaromatic diradical with 1 to 40 carbon atoms which may have ether, thio, or amine linkages in the main chain;

* denotes a urethane linkage; and

E and E' denote polymerizable unsaturated organic radicals represented by the general chemical formula:

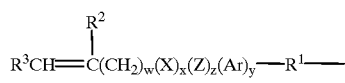

wherein $R^1$ denotes a divalent alkylene radical with 1 to 10 carbon atoms;

$R^2$ denotes a —H or —$CH_3$ radical;

$R^3$ denotes a —H radical or an alkyl radical with 1 to 6 carbon atoms or a —COY—$R^4$ radical where Y is —O—, —S— or —NH— and; and $R^4$ denotes an alkyl radical with 1 to 12 carbon atoms;

Z is —O— or —NH—;

X denotes —CO—, or —OCO—;

Ar denotes an aromatic radical with 6 to 30 carbon atoms;

a is at least 1;

w is 0 to 6;

x is 0 or 1;

y is 0 or 1;

z is 0 or 1.

5. The hydrogel material of claim 4, wherein said prepolymer has the formula E(*D*A*D*G)$_a$*D*A*D*E'.

6. The hydrogel material of claim 5, wherein the G radical is formed from neopentyl glycol, the D radical is formed from isophorone diisocyanate, and the E and E' radicals are each formed from 2-hydroxyethylmethyacrylate.

7. The hydrogel material of claim 4, wherein said prepolymer has the formula E(*D*G*D*A)$_a$*D*G*D*E'.

8. The hydrogel material of claim 7, wherein the D radical is formed from isophorone diisocyanate.

9. The hydrogel material of claim 8, wherein the G radical is formed from neopentyl glycol, diethylene glycol or 1,4-butanediol.

10. The hydrogel material of claim 9, wherein the E and E' radicals are formed from 2-hydroxyethylmethyacrylate.

11. The hydrogel material of claim 7, wherein the comonomer mixture comprises:

(a) 30 to 90 weight percent of the polysiloxane-containing urethaneprepolymer;

(b) 1 to 30 weight percent of tris(trimethylsiloxy) silylpropyl methacrylate; and (c) 20–40 weight percent of the hydrophilic monomer.

12. The hydrogel material of claim 1, which has a water content of at least 22.4 weight percent.

* * * * *

UNITED STATES PATENT AND TRADEMARK OFFICE
CERTIFICATE OF CORRECTION

PATENT NO. : 6,312,706 B1  
DATED : November 6, 2001  
INVENTOR(S) : Yu-Chin Lai and Louis J. Baccei Page 1 of 1

It is certified that error appears in the above-identified patent and that said Letters Patent is hereby corrected as shown below:

<u>Title page,</u>  
Item [75], Inventors, name should be -- Yu-Chin Lai --;

<u>Column 23,</u>  
Line 3, insert -- N,N- -- after the word "includes";

<u>Column 24,</u>  
Line 36, insert a space between the words "urethane" and "prepolymer".

Signed and Sealed this

Eighth Day of June, 2004

JON W. DUDAS  
*Acting Director of the United States Patent and Trademark Office*